United States Patent
Miller

(10) Patent No.: US 7,688,319 B2
(45) Date of Patent: Mar. 30, 2010

(54) METHOD AND APPARATUS FOR RENDERING SEMI-TRANSPARENT SURFACES

(75) Inventor: Gavin S. Miller, Los Altos, CA (US)

(73) Assignee: Adobe Systems, Incorporated, San Jose, CA (US)

( * ) Notice: Subject to any disclaimer, the term of this patent is extended or adjusted under 35 U.S.C. 154(b) by 154 days.

(21) Appl. No.: 11/272,209

(22) Filed: Nov. 9, 2005

(65) Prior Publication Data

US 2007/0103462 A1 May 10, 2007

(51) Int. Cl.
*G06T 15/00* (2006.01)
(52) U.S. Cl. .................................. 345/422
(58) Field of Classification Search ................ None
See application file for complete search history.

(56) References Cited

U.S. PATENT DOCUMENTS

| | | | |
|---|---|---|---|
| 5,920,687 A * | 7/1999 | Winner et al. ............... | 345/422 |
| 6,184,891 B1 | 2/2001 | Blinn | |
| 6,411,294 B1 * | 6/2002 | Furuhashi et al. ............. | 345/421 |
| 6,456,285 B2 * | 9/2002 | Hayhurst ..................... | 345/422 |
| 6,670,955 B1 * | 12/2003 | Morein ....................... | 345/421 |
| 6,891,533 B1 * | 5/2005 | Alcorn et al. ................ | 345/419 |
| 6,989,840 B1 * | 1/2006 | Everitt et al. ................ | 345/592 |
| 7,030,887 B2 * | 4/2006 | Andrews ..................... | 345/592 |
| 7,362,327 B2 * | 4/2008 | Katsuyama .................. | 345/422 |
| 2004/0119710 A1 * | 6/2004 | Piazza et al. ................ | 345/422 |
| 2005/0057574 A1 | 3/2005 | Andrews | |

* cited by examiner

*Primary Examiner*—Ulka Chauhan
*Assistant Examiner*—Andrew Yang
(74) *Attorney, Agent, or Firm*—Robert C. Kowert; Meyertons, Hood, Kivlin, Kowert & Goetzel, P.C.

(57) ABSTRACT

A system that renders a three-dimensional model which contains semi-transparent surfaces. During operation, the system renders the semi-transparent surfaces in the three-dimensional model by performing the following operations iteratively for each semi-transparent surface in draw-order instead of depth-order: (1) rendering the semi-transparent surface to a Z buffer, (2) calculating a cumulative transparency value for each pixel of the semi transparent surface as a function of the transparency value for each opaque and semi-transparent surface that intersects the pixel and is in front of the Z-value for the pixel in the Z-buffer, (3) attenuating a surface color value for each pixel in the semi-transparent surface by the cumulative transparency value for the pixel, and (4) adding the attenuated surface color value to a corresponding pixel value in the image buffer.

21 Claims, 4 Drawing Sheets

METHOD AND APPARATUS FOR RENDERING SEMI-TRANSPARENT SURFACES

BACKGROUND

1. Field of the Invention

The present invention relates to techniques for rendering 3-D models that have semi-transparent surfaces. More specifically, the present invention relates to a method and an apparatus for rendering semi-transparent surfaces in draw-order instead of depth-order.

2. Related Art

A typical problem encountered when rendering 3-D graphics models is "hidden surface" removal, which involves finding the nearest surface at each pixel. Since the image is created using only the color of the nearest shaded surface at each pixel, hidden surface removal produces a realistic depiction of opaque objects.

One technique for rendering hidden surfaces involves sorting the triangles which make up the surface so that the nearest triangles are rendered last when rasterizing the triangles to the image buffer. Note that an image buffer stores rendered pixels. This geometry sort is referred to as an "object space sort." Unfortunately, this technique can be problematic for complex models containing intersecting surfaces, where the triangles which make up the surface have to be broken up into smaller pieces.

A second technique for hidden surface removal stores the depth value (Z-value) at each pixel sample. This technique is referred to as an image-based sort. The Z-value is initialized to a far value, and the surfaces are then rasterized to compute the surface Z-value at each pixel. If the surface Z-value is smaller than the Z-value for the pixel sample, then the pixel color and pixel Z-value are replaced with the surface color and surface Z-value.

A "Z-buffer" technique is the preferred method for rendering opaque surfaces in modern graphics hardware. Note that a Z-buffer is part of an off-screen memory which stores the distance of each pixel from the view point (i.e. the Z-value). When using the Z-buffer technique to render images, aliasing (i.e. stair-step artifacts) can result on geometry edges. Modern graphics hardware solves the aliasing problem in several ways. One technique is to render the image to an off-screen buffer that is larger than the final displayed image, and to then filter down the result. Another technique renders the image several times, slightly jittering the camera each time. The average of the resulting images is properly anti-aliased. However, the preferred solution is referred to as "full-screen anti-aliasing" in which there are multiple color and Z-samples per pixel.

Modern graphics hardware runs small programs called "pixel shaders" at each pixel, which compute the surface color and the alpha values for each pixel based on texture values. These pixel shaders are relatively expensive to execute. One optimization, which is important for full-screen anti-aliasing, is to compute the pixel shader once per pixel, and to use the resulting color and the alpha value for each of the sub-pixels when performing Z-buffering. The Z-value is then interpolated correctly for each sub-pixel from the geometry to allow for anti-aliased intersections to be rendered correctly. To render properly anti-aliased Z-buffered opaque geometry on modern graphics hardware, it is desirable to use the full-screen anti-aliasing feature.

Hence, what is needed is a method and an apparatus for rendering 3-D models that have semi-transparent surfaces without the problems described above.

SUMMARY

One embodiment of the present invention provides a system that renders a three-dimensional model which contains semi-transparent surfaces. During operation, the system renders the semi-transparent surfaces in the three-dimensional model by performing the following operations iteratively for each semi-transparent surface in draw-order instead of depth-order: (1) rendering the semi-transparent surface to a Z-buffer, (2) calculating a cumulative transparency value for each pixel of the semi-transparent surface as a function of the transparency value for each opaque and semi-transparent surface that intersects the pixel and is in front of the Z-value for the pixel in the Z-buffer, (3) attenuating a surface color value for each pixel in the semi-transparent surface by the cumulative transparency value for the pixel, and (4) adding the attenuated surface color value to a corresponding pixel value in an image buffer. Note that rendering the semi-transparent surfaces in draw-order instead of depth-order avoids the time-consuming process of sorting the geometries for three-dimensional models to establish a depth-ordering.

In a variation on this embodiment, while rendering the semi-transparent surface to the Z-buffer, the system renders all semi-transparent geometries for the three-dimensional model. While doing so, the system performs a stencil test for each pixel intersected by the semi-transparent geometry, wherein the stencil test compares a stencil value for each pixel, which indicates how many surfaces have been rendered so far for the pixel, against a reference value, which identifies a current semi-transparent surface to be rendered to the Z-buffer. If the stencil value matches the reference value, the system stores the Z-value for the semi-transparent geometry at the pixel to the Z-buffer, and increments the stencil value whether or not the stencil value matches the reference value.

In a variation on this embodiment, while calculating the cumulative transparency value for each pixel in the semi-transparent surface, the system renders all opaque and semi-transparent geometries for the three-dimensional model. While doing so, the system multiplies the cumulative transparency value for each pixel, which is intersected by the geometry, by the transparency value for the geometry at the pixel, if the geometry is in front of the corresponding Z-value at the pixel.

In a variation on this embodiment, while adding the surface color for the semi-transparent surface at each pixel, the system renders all semi-transparent geometries for the three-dimensional model. While doing so, the system uses a Z-equals test or a stencil test at each pixel to identify the semi-transparent surface to be rendered. Next, the system looks up a color value at each pixel for the semi-transparent surface to be rendered and attenuates the color value for the semi-transparent surface at each pixel by the cumulative transparency value for the pixel. The system then adds the attenuated color value for each pixel to the image buffer.

In a variation on this embodiment, while performing the operations iteratively for each semi-transparent surface, the system performs the iterations until a termination condition is satisfied.

In a further variation, during each iteration, the system performs an occlusion query while rendering each semi-transparent surface to the Z buffer, wherein the occlusion query returns the number of pixels which were written to the Z-buffer during the rendering process. If the occlusion query indicates that no pixels were written to the Z-buffer during the rendering process, the system determines that the termination condition is satisfied and does not perform additional iterations.

In a further variation, while performing the occlusion query, the system determines the number of iterations required to render a previous frame, and starts the occlusion query one or more iterations prior to the number of iterations required to render the previous frame.

In a variation on this embodiment, prior to rendering the semi-transparent surfaces in the three-dimensional model, the system renders all opaque surfaces to the Z-buffer and the image buffer. Next, the system determines cumulative transparency values for all semi-transparent surfaces in front of the Z-values for the opaque surfaces in the Z-buffer, and attenuates the color values of pixels for opaque surfaces in the image buffer by the cumulative transparency values.

In a variation on this embodiment, while determining the cumulative transparency values, the system identifies semi-transparent surfaces that are completely-occluded by the opaque surfaces in the Z-buffer, and excludes the identified completely-occluded semi-transparent surfaces while subsequently rendering the semi-transparent surfaces.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Transparency and Ordering

Transparent surfaces in computer graphics are considered ideal surfaces which only partially obscure surfaces behind them. These surfaces are semi-transparent, blocking a fraction of the light that passes through them while also adding extra light. Some graphics models use a more general transparency model in which the foreground and the background alpha and color values are combined using a "blending function." Note that a blending function is also known as a compositing operator.

Figure 1:
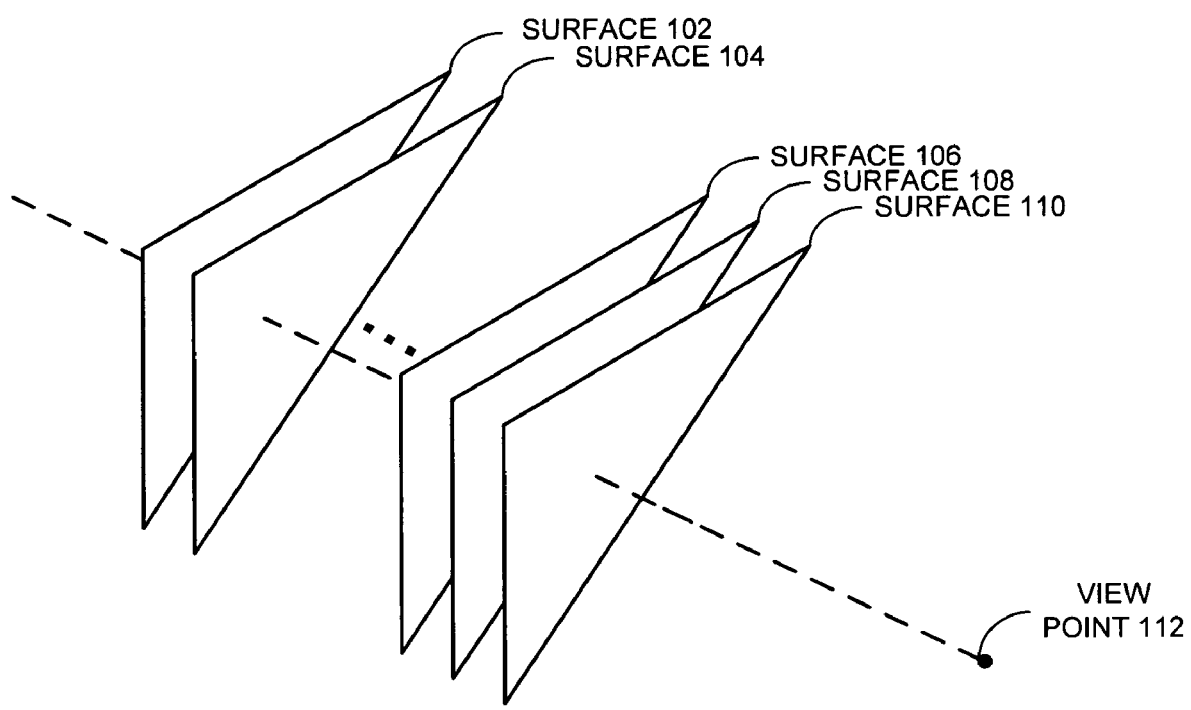
FIG. 1 illustrates multiple transparent surfaces.

FIG. 1 illustrates multiple transparent surfaces. It contains semi-transparent surfaces 102, 104, 106, 108, and 110, and view point 112. Note that semi-transparent surface 102 lies behind surface 104. Semi-transparent surfaces 106, 108, and 110 lie in front of surface 104. When determining the color for a given pixel in the frame, the contribution to the final color value by a given semi-transparent surface is a function of the color value for the given surface attenuated by the transparency of each surface in front of the given surface.

Note that the triangles representing the surfaces do not necessarily perfectly line-up as illustrated in FIG. 1. Also note that the triangles do not need to have the same size and shape.

Note that this specification uses the terms referred to as "Z-far" and "Z-near." Z-far and Z-near are used to ensure that the depth values stored in the Z-buffers are of a known finite range. Z-far can be as large as infinity, but Z-near must be greater than zero otherwise a divide-by-zero occurs. A more accurate depth test can be performed for a given precision of depth buffer values when Z-far and Z-near values tightly bracket the actual geometry. Thus, Z-far and Z-near values are chosen so that they tightly bracket the geometry being rendered.

The blending function referred to as "over" is common for representing surfaces in 3-D scenes. A surface can be described by an opaque color along with a transparency value. The surface transparency value directly scales the amount of light coming through the surface, and one minus the transparency value scales the opaque color before adding the result to the pixel. To simplify subsequent calculations, the surface color is defined as the pre-multiplied surface color (i.e. the surface opaque color value) multiplied by one minus the surface transparency value.

The formula for the over operator is then given by (1), where the colors are for the pixel before and after compositing of the Nth surface.

$$C_{pixel}^N = C_{surface}^N + T_{surface}^N * C_{pixel}^{N-1} \qquad (1)$$

One technique to compute the final color arising from a stack of transparent surfaces is to sort them in order of depth value (Z-value), and to then apply equation (1) from back-to-front. When there are opaque surfaces in the scene as well, the nearest opaque surface is first used to set the color of the pixel. Any transparent surfaces behind the nearest opaque surface are discarded since they are obscured by the opaque surface. This technique is referred to as "back-to-front compositing."

Another technique is to operate on the surfaces in front-to-back order. In addition to the pixel color, a transparency value is kept at each pixel sample. This pixel transparency is initially set to one. For subsequent surfaces, the values of the pixel sample transparency and pixel sample color are modified using equations (2) and (3).

$$C_{pixel}^N = T_{pixel}^{N-1} C_{surface}^N + C_{pixel}^{N-1} \qquad (2)$$

$$T_{pixel}^N = T_{pixel}^{N-1} T_{surface}^N \qquad (3)$$

In both cases the pixels are updated by surfaces in an order that corresponds to a depth sort.

Order Independent Transparency (Layer Peeling)

To avoid sorting geometries, a different technique is used during rasterization. One such technique is called "layer peeling," which renders the geometry multiple times and which uses two Z-buffers to compute the nearest surface, the next nearest surface, and so on. The same technique can also be used to render back-to-front.

The back-to-front layer peeling process is as follows:
  1. Z-buffer1 is set to Z-far and an opaque geometry is rendered into Z-buffer1 and ImageBuffer1. The Z-test set to find the nearest surface.

2. Z-buffer1 is copied to Z-buffer2.
3. The geometry is then rendered to Z-buffer1 and the furthest surface nearer than the depth value (Z-value) stored in Z-buffer2 is found. This is achieved by setting the Z-test rule for Z-buffer1 to find the furthest surface. At the same time Z-buffer2 is used to cull any surface fragments with a Z-value greater than or equal to Z-buffer1. At this point, Z-buffer1 now contains a Z-value that is the depth of the next nearest surface.
4. The geometry is rendered into ImageBuffer1 using a blending function and a Z-equals test, which operates on the Z-values stored in Z-buffer1.
5. Steps 2 through 4 are repeated until the number of visible pixels in Step 3 is zero. Note that this condition is checked by using an occlusion test, which returns a count of how many pixels passed the Z-test. Note that occlusion is the effect of one surface blocking another surface from view.

By reversing the logic of the Z-test the layer peeling technique we can render front-to-back. However, note that a different blending function must be used in Step 4.

Another technique renders the layers in front-to-back order into a series of image buffers—one for each peel layer. This approach combines Steps 3 and 4, but requires a final composite of the separate buffers. This technique reduces the geometry transformation overhead.

The advantage of the front-to-back technique is that the nearest M layers can be rendered, and in some cases, the technique can be stopped early with visually acceptable results. To create an accurate image, the scene is rendered N times where N is the largest number of semi-transparent layers in front of an opaque surface for all the pixels. For an image with N layers that completely cover the screen, the worst case is that each pixel would be touched N-squared times.

A major drawback of the layer peeling technique is the need for a second Z-buffer. On modem graphics hardware, a depth texture can be used to store the depth value (Z-value) of the Z-buffer. Originally designed for Z-buffered shadows, the depth texture test allows one sample per pixel and returns the result of testing a depth value against the contents of a pixel. Unfortunately, given the sample constraint on depth textures, layer peeling is incompatible with full-screen anti-aliasing. Furthermore, there is also a memory bandwidth overhead when copying from Z-buffer1 to Z-buffer2.

Multiplied Occluding Transparency Technique

Embodiments of the present invention enable correct-looking transparent rendering without the need for a second Z-buffer and the associated overhead of copying values between the two Z-buffers. Embodiments of the present invention also make use of the full-screen anti-aliasing mechanism of modern graphics hardware, which is not supported by double Z-buffer techniques such as layer peeling.

Typical images which can be rendered by the present invention include three-dimensional computer-aided design (CAD) models and three-dimensional scenes. Note that the present invention can render other three-dimensional images.

One embodiment of the present invention first renders all of the opaque objects to the image buffer and then dims the pixels in the image buffer by the product of the occluding transparent surface transparency values. It then renders each transparent surface that touches the pixel, adding the surface color multiplied by the multiplied transparency values of the surfaces closer than it to the image buffer. These steps are all accomplished without sorting the polygons that make up the surface, but by only performing pixel operations.

In one embodiment of the present invention, the surface color is attenuated by the product of the transparency values of the N surfaces in front of it, as illustrated in (4). Note that this technique is only true for a limited set of blending operations (such as "over"), but this technique is a useful set for 3-D graphics.

$$C_i = T_{surface}^N T_{surface}^{N-1} \ldots T_{surface}^1 C_{surface}^i \qquad (4)$$

Note that the transparency values $T_{surface}$ are for the N surfaces in front of surface i. Also note that they can be multiplied in any order since multiplication is commutative.

The final pixel value is given by (5).

$$C_{pixel} = \Sigma_i C_i \qquad (5)$$

Note that the summation in (5) can be done in any order since addition is commutative, which means that it is not necessary to render surfaces to pixels in depth-sorted order. Instead, the surface can be rendered in arbitrary order, provided that each surface color is scaled using (4) and then combined into an image buffer using (5).

Figure 2:
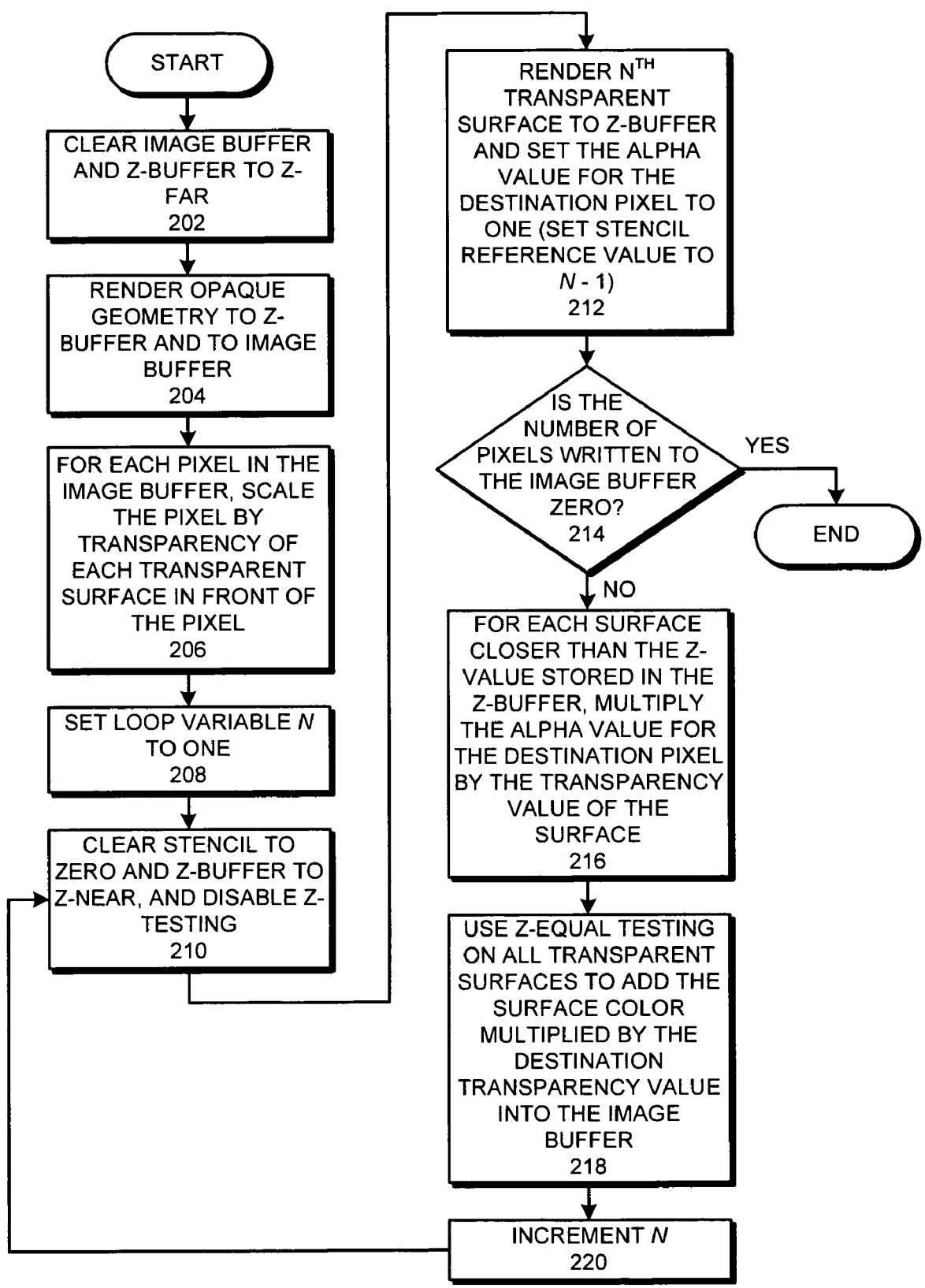
FIG. 2 presents a flow chart illustrating the process of rendering surfaces that are semi-transparent in accordance with an embodiment of the present invention.

FIG. 2 presents a flow chart illustrating the process of rendering surfaces that are semi-transparent in accordance with an embodiment of the present invention. The process begins when the system clears the image buffer and Z-buffer to Z-far (step 202). Next the system renders the opaque geometry to the Z-buffer and the image buffer (step 204). For each pixel in the image buffer, the system then scales each pixel by the transparency of each transparent surface in front of the pixel (step 206). The system then sets the loop variable (i.e. the iteration number) N to 1 (step 208).

Next, the system clears the stencil to 0 and the Z-buffer to Z-near, and disables Z-testing (step 210). Note that Z-far can also be used, but Z-near is more efficient for hardware Z-culling. For each pixel, the system then renders the $N^{th}$ transparent surface to the Z-buffer setting the alpha value for the pixel to 1 (the system also sets the stencil reference value to N–1) (step 212). Note that the system issues a render all geometry command to the graphics card to perform this step. The system finds the $N^{th}$ transparent surface to touch a pixel by using a stencil test (described below).

The system then determines whether the number of pixels written to the image buffer was zero (step 214). If so, the process ends. Otherwise, the process continues to step 216. Note that the system uses an occlusion query to determine if the number of pixels written to the image buffer is zero.

For each surface closer than the Z-value stored in the Z-buffer, the system multiplies the alpha value (the cumulative transparency value) for the pixel by the transparency value of the surface (step 216). Note that opaque objects are considered to have a transparency of zero. Also note that Z-testing is enabled for this step. Furthermore, note that the system issues a render all geometry command to the graphics card to perform this step.

Next, the system uses a Z-equals test or a stencil test to add the surface color multiplied by the destination transparency value into the image buffer (step 218). Note that color writing is enabled for this step. Also note that the system issues a render all geometry command to the graphics card to perform this step. The system finds the $N^{th}$ transparent surface to touch a pixel by using a stencil test (described below). The system then increments N (step 220) and returns to step 210 for the next iteration.

Note that steps 210 to 218 are repeated M times, where M is the maximum number of surfaces overlapping any given pixel in the frame. Note that M is not known beforehand and must be determined using a termination condition test.

Termination Condition Test

In one embodiment of the present invention, for each iteration, the system performs an occlusion query after rendering N transparent surfaces that touch the pixel to the Z-buffer. This occlusion query returns the number of pixels which stored a Z-value to the Z-buffer. The system then determines if any pixels stored a Z-value to the Z-buffer. If not, the system determines that the subsequent iterations of steps 210 to 218 in FIG. 2 will not draw pixels to the image buffer and terminates the process.

In another embodiment of the present invention, the system determines the final value of the loop variable prior to terminating the process in the previous frame and starts the occlusion query one or more iterations prior to the final value of the loop variable from the previous frame. Note that this technique typically reduces the number of occlusion queries required. Also note that for a few frames after a scene that has a large decrease in depth complexity, the value of N ramps down slowly. However, in the typical case, N occlusion queries are replaced by 2 occlusion queries.

Stencil Test

Step 212 in FIG. 2 employs the stencil buffer feature of modern graphics hardware. A stencil is a set of bits which can be modified and which can be tested at each pixel during scan-conversion. The stencil value is initialized to zero during step 210. A stencil test is then used during step 212, where the stencil is tested against a value of N−1. When the stencil test passes, the surface Z-value is written to the Z-buffer. Whether the stencil test and Z-test pass or fail, the stencil value is incremented. This technique writes the depth value of the $N^{th}$ surface to touch a pixel into the Z-buffer. (See "Near Real-Time CSG Rendering Using Tree Normalization and Geometric Pruning", Jack Goldfeather, Steven Molnar, Greg Turk, and Henry Fuchs, IEEE Computer Graphics and Applications, Volume 9, Issue 3 (May 1989) Pages: 20-28.)

Figure 3:
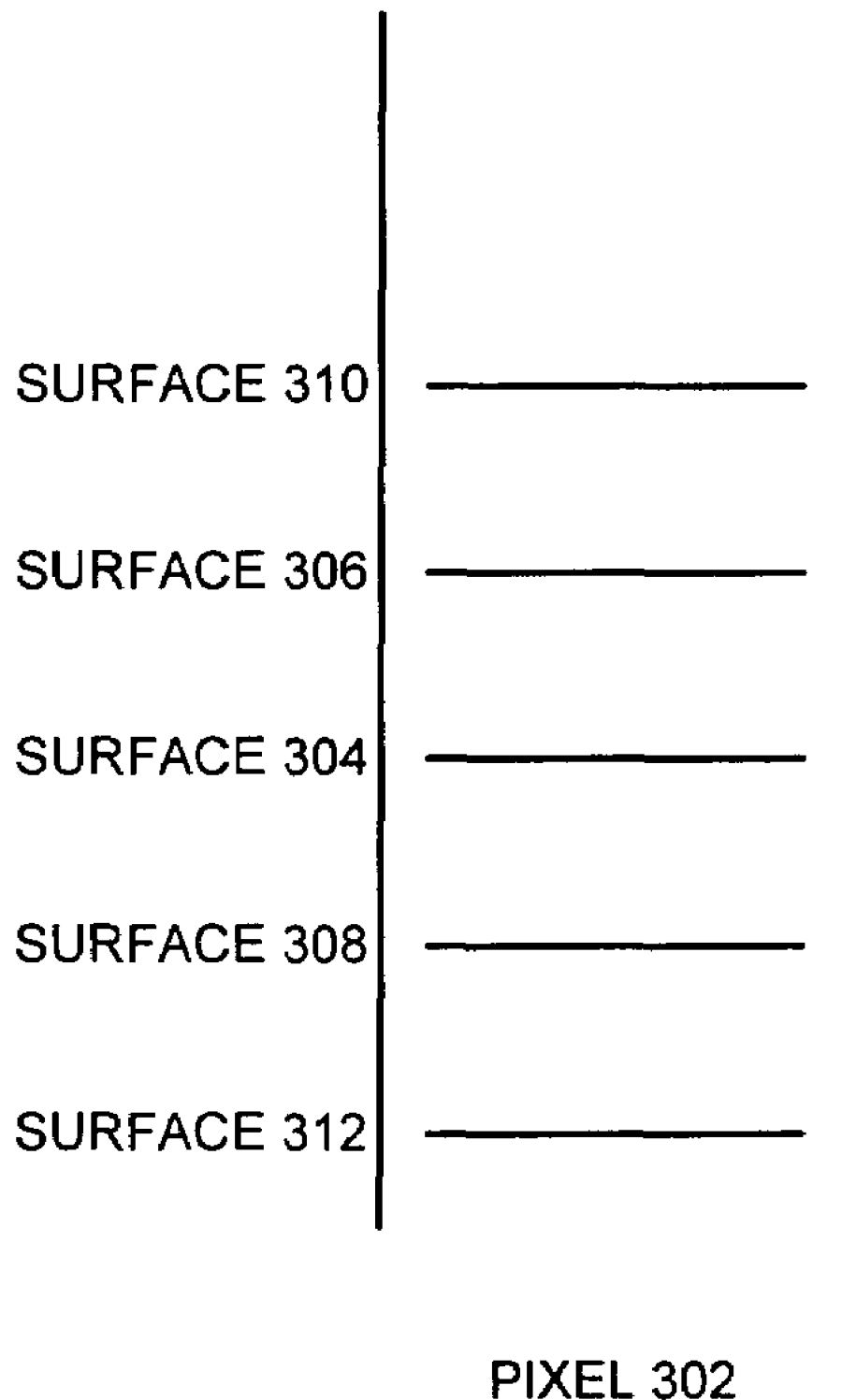
FIG. 3 illustrates multiple transparent surfaces at a pixel in accordance with an embodiment of the present invention.

FIG. 3 illustrates multiple transparent surfaces at pixel 302 in accordance with an embodiment of the present invention. When the system issues a "render all geometries" command to the graphic card, the transparent surfaces are rendered in draw-order and not in occlusion order. In other words, transparent surfaces are rendered in the order that they are received by the graphics card and are not rendered in Z-value sorted order. For example, in FIG. 3, surfaces 304, 306, 308, 310, and 312 are submitted to the graphics card in draw-order. However, the occlusion order is such that surface 312 is the farthest surface from the viewing point, followed by surfaces 308, 304, 306, and 310.

To obtain a given surface in depth-order, the present invention uses a stencil test. For example, to get the second surface to touch pixel 302 (i.e. surface 306), which corresponds to the surface being operated on in the second iteration, the reference value is set to 1 (i.e. N−1) and the stencil is initialized to 0. After the first surface to touch the pixel is rendered (surface 304), a stencil test is performed. Since N=0 and the reference value was set to 1, the stencil test does not pass. Next, the stencil is incremented to 1 (i.e. N=1). After the second surface to touch the pixel is rendered (surface 306), the stencil test is performed. Since the current value of the stencil for the pixel equals to the reference value (i.e. N=the reference value=1), the system knows that the second surface to touch the pixel has been found and the stencil test passes. Next, the stencil is incremented to 2 (i.e. N=2).

Note that during iteration 1, only the first surface to touch the pixel will be allowed to write to the Z-buffer, and during iteration 5, only the fifth surface to touch the pixel will be allowed to write to the Z-buffer, etc.

In one embodiment of the present invention, the stencil is initialized to a value other than zero and is tested against an offset value of the loop variable N. In another embodiment of the present invention, the stencil is decremented from a high number instead of incremented from a low number.

In one embodiment of the present invention, this technique is used with a compositing model that combines a value from each nearer surface in a commutative way and uses the result to control the blending of the original surface color into the image buffer. An example is a compositing model that adds the alpha values from all of the nearer surfaces and uses the result to control the blending of the original surface color into the image buffer.

Rendering Transparent Surfaces Behind Opaque Surfaces

Figure 4:
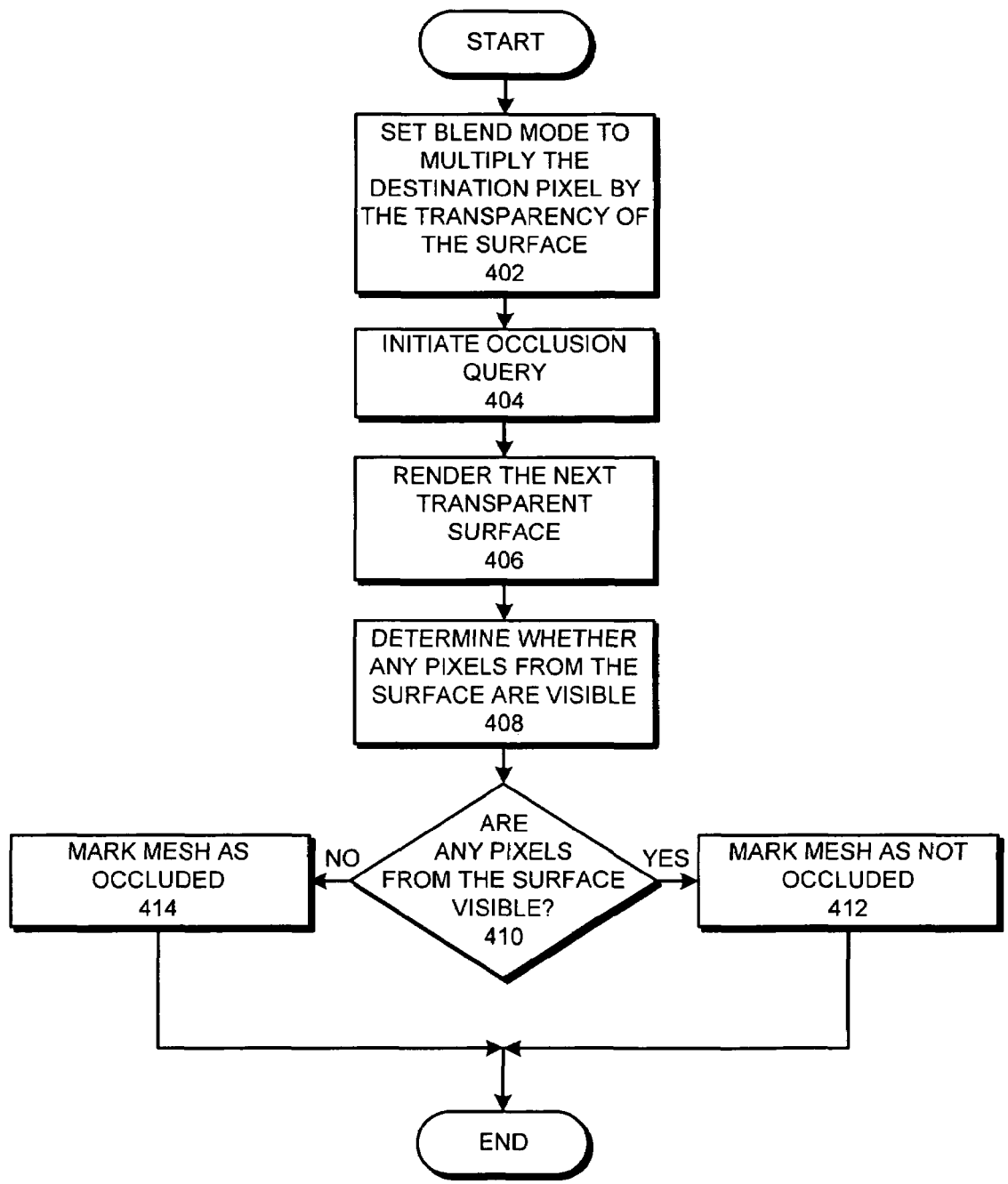
FIG. 4 presents a flow chart illustrating the process of rendering semi-transparent surfaces that are hidden behind opaque surfaces in accordance with an embodiment of the present invention.

If a large number of transparent layers are hidden behind opaque surfaces, the system uses an occlusion query in step 210 in FIG. 2. FIG. 4 presents a flow chart illustrating the process of rendering semi-transparent surfaces that are hidden behind opaque surfaces in accordance with an embodiment of the present invention. The process expands on step 210 in FIG. 2.

The process in FIG. 4 begins when the system sets the blend mode to multiply the destination pixel by the transparency of the surface (step 402). Next, the system initiates an occlusion query (step 404). The system then renders the next semi-transparent surface (step 406). Next, the system determines whether any pixels from the surface are visible (steps 408 and 410). If so, the system marks the mesh as not occluded (step 412). Otherwise, the system marks the mesh as occluded (step 414).

Note that steps 404 to 410 are repeated for each transparent surface. Also note that if a transparent surface is completely occluded by the Z-buffer, it is removed from consideration in subsequent rendering operations.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for rendering a three-dimensional model which includes a plurality of semi-transparent surfaces, the method comprising:
   initializing an iteration variable N to 1;
   rendering the plurality of semi-transparent surfaces the three-dimensional model by performing the following operations iteratively for two or more of the plurality of semi-transparent surfaces in draw-order, wherein the draw-order is contrary to a depth-order for at least a portion of the plurality of semi-transparent surfaces and wherein N corresponds to the draw-order:
   initializing a Z-buffer, wherein said initializing sets all depth values in the Z-buffer to a default depth value that ensures that depth values stored to the Z-buffer are of a known finite range;
   rendering the Nth semi-transparent surface according to the draw-order to the Z-buffer, wherein said rendering the Nth semi-transparent surface to the Z-buffer stores depth values for the Nth semi-transparent surface to the Z-buffer,
   calculating a cumulative transparency value for each pixel of the semi-transparent surface as a function of the transparency value for each surface of the three-dimensional model that intersects the pixel and that is in front of the pixel according to the depth value for the pixel in the Z-buffer, attenuating a surface color value for each pixel the semi-transparent surface by the cumulative transparency value for the respective pixel, adding the attenuated surface color value for each pixel of the semi-transparent surface to a corresponding pixel value in an image buffer, and incrementing N by 1;

wherein, during each iteration, depth values for only the Nth semi-transparent surface according to the draw-order are stored in the Z-buffer.

2. The method of claim 1, wherein the three-dimensional model further includes one or more opaque surfaces, and wherein, in said calculating a cumulative transparency value for each pixel of the semi-transparent surface, both the opaque surfaces and the semi-transparent surfaces are considered in identifying surfaces of the three-dimensional model that intersect the pixel and that are in front of the pixel.

3. The method of claim 1, wherein said rendering the Nth semi-transparent surface according to the draw-order to the Z-buffer comprises:

for each pixel, initializing a stencil value rendering all semi-transparent geometries of the three-dimensional model, wherein rendering a given semi-transparent geometry comprises, for each pixel that is intersected by the given semi-transparent geometry:

performing a stencil test for the pixel, wherein the stencil test compares stencil value for the pixel to a reference value, wherein the stencil value indicates how many surfaces have been rendered so far for the respective pixel, and wherein the reference value identifies a current semi-transparent surface to be rendered to the Z-buffer;

if the stencil value for the pixel matches the reference value, storing the depth value for a point on a surface of the given semi-transparent geometry corresponding to the pixel to the Z-buffer; and incrementing the stencil value for the pixel.

4. The method of claim 1, wherein said calculating the cumulative transparency value for each pixel of the semi-transparent surface comprises:

initializing a cumulative transparency value for the pixel of the semi-transparent surface to an initial value; and for each surface of the three-dimensional model that intersects the pixel and that is in front of the pixel according to the depth value for the pixel in the Z-buffer, set the cumulative transparency value for the pixel to the current cumulative transparency value multiplied by a transparency value of the respective surface.

5. The method of claim 1, wherein, to perform said attenuating a surface color value for each pixel of the semi-transparent surface by the cumulative transparency value for the respective pixel and said adding the attenuated surface color value for each pixel of the semi-transparent surface to a corresponding pixel value in an image buffer, the method involves rendering all semi-transparent geometries for the three-dimensional model, and while doing so, the method involves, for each pixel:

performing a Z-equals test or a stencil test to identify the semi-transparent surface to be rendered at the pixel;

looking up the surface color value for the identified semi-transparent surface at a point of the identified semi-transparent surface corresponding to the pixel;

performing said attenuating the surface color value for the pixel by multiplying the surface color value at the point of the identified semi-transparent surface corresponding to the pixel by the cumulative transparency value for the respective pixel; and performing said adding the attenuated color value for the pixel to the corresponding pixel value in the image buffer.

6. The method of claim 1, wherein said rendering the plurality of semi-transparent surfaces of the three-dimensional model by performing the operations iteratively for two or more of the plurality of semi-transparent surfaces involves performing the iterations until a termination condition is satisfied.

7. The method of claim 6, wherein for each iteration, the method further comprises:

performing an occlusion query while rendering each semi-transparent surface to the Z-buffer, wherein the occlusion query returns the number of pixels which were written to the Z-buffer while rendering a current semi-transparent surface;

if the occlusion query indicates that no pixels were written to the Z-buffer during the rendering process, determining that the termination condition is satisfied.

8. The method of claim 7, wherein said performing an occlusion query involves:

determining a number of iterations required to render a previous frame; and staffing the occlusion query one or more iterations prior to the number of iterations required to render the previous frame.

9. The method of claim 1, wherein the three-dimensional model further includes one or more opaque surfaces, and wherein, prior to said rendering the plurality of semi-transparent surfaces of the three-dimensional model, the method further comprises:

rendering the opaque surfaces of the three-dimensional model to the Z-buffer and the image buffer; and for each pixel in the image buffer, scaling a color value stored in the pixel of the image buffer by a transparency value of each of the plurality of semi-transparent surfaces that are in front of the pixel according to a depth value stored in a corresponding location of the Z-buffer.

10. The method of claim 1, wherein the three-dimensional model further includes one or more opaque surfaces, and wherein, prior to said rendering the plurality of semi-transparent surfaces of the three-dimensional model, the method further comprises:

identifying one or more of the plurality of semi-transparent surfaces that are completely-occluded by the opaque surfaces of the three-dimensional geometry; and wherein, in said rendering the plurality of semi-transparent surfaces of the three-dimensional model, the operations are not performed for the identified one or more completely-occluded semi-transparent surfaces.

11. A computer-readable storage medium storing instructions that when executed by a computer cause the computer to perform a method for rendering a three-dimensional model which includes a plurality of semi-transparent surfaces, the method comprising:

initializing an iteration variable N to 1;

rendering the plurality of semi-transparent surfaces of the three-dimensional model by performing the following operations iteratively for two or more of the plurality of semi-transparent surfaces in draw-order, wherein the draw-order is contrary to a depth-order for at least a portion of the plurality of semi-transparent surfaces and wherein N corresponds to the draw-order:

initializing a Z-buffer, wherein said initializing sets all depth values in the Z-buffer to a default depth value that ensures that depth values stored to the Z-buffer are of a known finite range;

rendering the Nth semi-transparent surface according to the draw-order to the Z-buffer, wherein said rendering the Nth semi-transparent surface to the Z-buffer stores depth values for the Nth semi-transparent surface to the Z-buffer, calculating a cumulative transparency value for each pixel of the semi-transparent surface as a function of the transparency value for each surface of the three-dimensional model that intersects the pixel and that is in front of the pixel according to the depth value for the pixel in the Z-buffer, attenuating a surface color value for each pixel of the semi-transparent surface by the cumulative transparency value for the respective pixel, adding the attenuated surface color value for each pixel of the semi-transparent surface to a corresponding pixel value in an image buffer, and incrementing N by 1;

wherein, during each iteration, depth values for only the Nth semi-transparent surface according to the draw-order are stored in the Z-buffer.

12. The computer-readable storage medium of claim 11, wherein the three-dimensional model further includes one or more opaque surfaces, and wherein, in said calculating a cumulative transparency value for each pixel of the semi-transparent surface, both the opaque surfaces and the semi-transparent surfaces are considered in identifying surfaces of the three-dimensional model that intersect the pixel and that are in front of the pixel.

13. The computer-readable storage medium of claim 11 wherein said rendering the Nth semi-transparent surface according to the draw-order to the Z-buffer comprises:

for each pixel, initializing a stencil value rendering all semi-transparent geometries of the three-dimensional model, wherein rendering a given semi-transparent geometry comprises, for each pixel that is intersected by the given semi-transparent geometry:

performing a stencil test for the pixel, wherein the stencil test compares the stencil value for the pixel to a reference value, wherein the stencil value indicates how many surfaces have been rendered so far for the respective pixel, and wherein the reference value identifies a current semi-transparent surface to be rendered to the Z-buffer;

if the stencil value for the pixel matches the reference value, storing the depth value for a point on a surface of the given semi-transparent geometry corresponding to the pixel to the Z-buffer; and incrementing the stencil value for the pixel whether or not the stencil value matches the reference value.

14. The computer-readable storage medium of claim 11, wherein said calculating the cumulative transparency value for each pixel of the semi-transparent surface comprises:

initializing a cumulative transparency value for the pixel of the semi-transparent surface to an initial value; and for each surface of the three-dimensional model that intersects the pixel and that is in front of the pixel according to the depth value for the pixel in the Z-buffer, set the cumulative transparency value for the pixel to the current cumulative transparency value multiplied by a transparency value of the respective surface.

15. The computer-readable storage medium of claim 11, wherein, to perform said attenuating a surface color value for each pixel of the semi-transparent surface by the cumulative transparency value for the respective pixel and said adding the attenuated surface color value for each pixel of the semi-transparent surface to a corresponding pixel value in an image buffer, the method involves rendering all semi-transparent geometries for the three-dimensional model, and while doing so, the method involves, for each pixel:

performing a Z-equals test or a stencil test to identify the semi-transparent surface to be rendered at the pixel;

looking up the surface color value for the identified semi-transparent surface at a point of the identified semi-transparent surface corresponding to the pixel;

performing said attenuating the surface color value for the pixel by multiplying the surface color value at the point of the identified semi-transparent surface corresponding to the pixel by the cumulative transparency value for the respective pixel; and performing said adding the attenuated color value for the pixel to the corresponding pixel value in the image buffer.

16. The computer-readable storage medium of claim 11, wherein said rendering the plurality of semi-transparent surfaces of the three-dimensional model by performing the operations iteratively for two or more of the plurality of semi-transparent surfaces involves performing the iterations until a termination condition is satisfied.

17. The computer-readable storage medium of claim 16, wherein for each iteration, the method further comprises:

performing an occlusion query while rendering each semi-transparent surface to the Z-buffer, wherein the occlusion query returns the number of pixels which were written to the Z-buffer while rendering a current semi-transparent surface;

if the occlusion query indicates that no pixels were written to the Z-buffer during the rendering process, determining that the termination condition is satisfied.

18. The computer-readable storage medium of claim 17, wherein said performing an occlusion query involves:

determining a number of iterations required to render a previous frame; and starting the occlusion query one or more iterations prior to the number of iterations required to render the previous frame.

19. The computer-readable storage medium of claim 11, wherein the three-dimensional model further includes one or more opaque surfaces, and wherein, prior to said rendering the plurality of semi-transparent surfaces of the three-dimensional model, the method further comprises:

rendering the opaque surfaces of the three-dimensional model to the Z-buffer and the image buffer; and for each pixel in the image buffer, scaling a color value stored in the pixel of the image buffer by a transparency value of each of the plurality of semi-transparent surfaces that are in front of the pixel according to a depth value stored in a corresponding location of the Z-buffer.

20. The computer-readable storage medium of claim 11, wherein the three-dimensional model further includes one or more opaque surfaces, and wherein, prior to said rendering the plurality of semi-transparent surfaces of the three-dimensional model, the method further comprises:

identifying one or more of the plurality of semi-transparent surfaces that are completely-occluded by the opaque surfaces of the three-dimensional geometry; and wherein, in said rendering the plurality of semi-transparent surfaces of the three-dimensional model, the operations are not performed for the identified one or more completely-occluded semi-transparent surfaces.

21. A computer comprising a computer-readable storage medium storing instructions that when executed by the computer cause the computer to:
- initialize an iteration variable N to 1;
- render the plurality of semi-transparent surfaces of the three-dimensional model by performing the following operations iteratively for two or more of the plurality of semi-transparent surfaces in draw-order, wherein the draw-order is contrary to a depth-order for at least a portion of the semi-transparent surfaces and wherein N corresponds to the draw-order:
  - initialize a Z-buffer, wherein said initializing sets all depth values in the Z-buffer to a default depth value that ensures that depth values stored to the Z-buffer are of a known finite range;
  - render the Nth semi-transparent surface according to the draw-order to the Z-buffer, wherein said rendering the Nth semi-transparent surface to the Z-buffer stores depth values for the Nth semi-transparent surface to the Z-buffer,
  - calculate a cumulative transparency value for each pixel of the semi-transparent surface as a function of the transparency value for each surface of the three-dimensional model that intersects the pixel and that is in front of the pixel according to the depth value for the pixel in the Z-buffer,
- attenuate a surface color value for each pixel of the semi-transparent surface by the cumulative transparency value for the respective pixel,
- the attenuated surface color value for each pixel of the semi-transparent surface to a corresponding pixel value in an image buffer, and
- increment N by 1; wherein, during each iteration, depth values for only the Nth semi-transparent surface according to the draw-order are stored in the Z-buffer.

* * * * *

UNITED STATES PATENT AND TRADEMARK OFFICE
CERTIFICATE OF CORRECTION

PATENT NO. : 7,688,319 B2 Page 1 of 1
APPLICATION NO. : 11/272209
DATED : March 30, 2010
INVENTOR(S) : Gavin S. Miller It is certified that error appears in the above-identified patent and that said Letters Patent is hereby corrected as shown below:

In the Claims:

Claim 8, col. 10, line 27, please delete "staffing" and insert --starting-- in place thereof.

Claim 13, col. 11, lines 53-54, please delete "whether or not the stencil value matches the reference value".

Signed and Sealed this

Sixth Day of July, 2010

David J. Kappos
*Director of the United States Patent and Trademark Office*